US012636808B1

(12) United States Patent
Dixon

(10) Patent No.: US 12,636,808 B1
(45) Date of Patent: May 26, 2026

(54) MITER DEVICE

(71) Applicant: Owen A. Dixon, Boynton Beach, FL (US)

(72) Inventor: Owen A. Dixon, Boynton Beach, FL (US)

( * ) Notice: Subject to any disclaimer, the term of this patent is extended or adjusted under 35 U.S.C. 154(b) by 195 days.

(21) Appl. No.: 18/513,057

(22) Filed: Nov. 17, 2023

Related U.S. Application Data

(60) Provisional application No. 63/429,024, filed on Nov. 30, 2022.

(51) Int. Cl.
*B27B 27/06* (2006.01)
*B27B 27/10* (2006.01)

(52) U.S. Cl.
CPC .............. *B27B 27/06* (2013.01); *B27B 27/10* (2013.01)

(58) Field of Classification Search
CPC .......... B27B 27/00; B27B 27/06; B27B 27/10
See application file for complete search history.

(56) References Cited

U.S. PATENT DOCUMENTS

| | | | | |
|---|---|---|---|---|
| 420,739 | A | 2/1890 | Schmitz | |
| 556,658 | A | 3/1896 | Barnes | |
| 2,895,515 | A | 7/1959 | Ende | |
| 3,491,805 | A | 1/1970 | Riedener | |
| 3,586,077 | A * | 6/1971 | Pease | B23Q 9/0014 30/376 |
| 3,901,498 | A | 8/1975 | Novak | |
| 3,941,020 | A | 3/1976 | Huntley et al. | |
| 4,317,562 | A | 3/1982 | Thibodaux | |
| 4,356,748 | A * | 11/1982 | Tilton | B27G 19/10 83/745 |
| 4,441,394 | A | 4/1984 | Barsotti | |
| 4,693,156 | A | 9/1987 | Olvera | |
| 4,871,156 | A * | 10/1989 | Kozyrski | B26D 7/2614 269/319 |
| 5,038,486 | A * | 8/1991 | Ducate, Sr. | B27B 29/00 83/435.14 |
| 5,402,701 | A * | 4/1995 | Ingram | B27B 25/10 269/304 |
| 5,743,161 | A | 4/1998 | Boudreau | |
| 5,845,410 | A * | 12/1998 | Boker | B27B 25/10 33/469 |

(Continued)

FOREIGN PATENT DOCUMENTS

| | | |
|---|---|---|
| KR | 20210144229 A | 11/2021 |

*Primary Examiner* — Adam J Eiseman
*Assistant Examiner* — Richard D Crosby, Jr.
(74) *Attorney, Agent, or Firm* — John Rizvi; John Rizvi, P.A.—The Patent Professor®

(57) ABSTRACT

A miter device is provided which includes a rectangular planar base with two adjustable angled guide rails releasably fixed to its top side. Each guide rail extends from the central front portion toward a side end at a first angle, then perpendicularly along the side ends. Two parallel longitudinal track guides, each with a track opening, are adjustably secured to the base in identical positions. A safety stop is inserted into an end of at least one track opening. The device includes a front end fence perpendicular to and extending along the front end, with a handle protruding from its front surface, and a rear end fence along the rear edge. The base further includes a blade track extending from the peninsular section through the rectangular recess and rear end fence.

20 Claims, 13 Drawing Sheets

(56) References Cited

U.S. PATENT DOCUMENTS

| | | | | |
|---|---|---|---|---|
| 6,499,224 | B1 * | 12/2002 | Asick | B23B 47/287 83/438 |
| 6,502,492 | B1 * | 1/2003 | Krohmer | B27B 25/10 83/435.14 |
| 6,698,328 | B1 * | 3/2004 | Schmidt | B27G 5/02 83/766 |
| 8,220,374 | B2 * | 7/2012 | Wang | B27B 27/10 83/435.15 |
| 8,376,333 | B2 * | 2/2013 | Zander | B23B 47/287 269/1 |
| 9,003,671 | B2 * | 4/2015 | Wang | B27B 27/08 33/640 |
| 9,233,464 | B2 * | 1/2016 | Sherman | B25H 1/0078 |
| 9,751,139 | B2 * | 9/2017 | Groth | B27B 9/04 |
| 10,532,603 | B2 * | 1/2020 | Hummel | B25H 7/02 |
| 10,843,368 | B2 * | 11/2020 | Friedebach | B27B 9/04 |
| 11,642,809 | B2 * | 5/2023 | Wollenburg | B27B 27/10 83/446 |
| 12,202,063 | B2 * | 1/2025 | Wille | G01B 3/1071 |
| 12,415,290 | B2 * | 9/2025 | Suhling | G01B 3/1071 |
| 2003/0233922 | A1 * | 12/2003 | Makropoulos | B23Q 9/0042 83/574 |
| 2006/0053992 | A1 | 3/2006 | Williams et al. | |

* cited by examiner

MITER DEVICE

CROSS-REFERENCE TO RELATED APPLICATIONS

This application claims the benefit of U.S. Provisional Patent Application Ser. No. 63/429,024, filed on Nov. 30, 2022, which is incorporated by reference herein in its entirety.

FIELD OF THE INVENTION

The present invention relates generally to the field of saw tools. More particularly, the present invention relates generally to miter devices.

BACKGROUND OF THE INVENTION

Carpentry has long been a trade of various craftsmen. One of the most important parts of carpentry is the ability to cut your material accurately and quickly, such material most commonly being wood. To make quick and accurate cuts of wood, various different tools may be employed by craftsmen.

One example of such a tool is a table saw. Table saws excel in being able to cut large pieces of wood, such as sheets of plywood. In addition, table saws are very effective in making rip cuts, i.e., cuts along the grain of wood, especially when the piece of wood calls for a long rip cut. Further, while table saws can make angled, or even beveled cuts to wood, table saws are usually only used for such when accuracy is not paramount. For example, table saws are often used in making angled cuts for framing, which will eventually be covered, or for cutting base boards, wherein exactness in and angled cut can be easily remedied with caulk and paint.

One concern with table saws is that they typically only have one side fence, i.e., a rip fence, and instead employ various hand tools, such as a miter gauge to push wood towards the spinning table saw blade. While using such tools does reduce the risk of injury, even when using a miter gauge, the direction of spin of a table saw blade is towards the user, and as such, if the blade gets caught on a knot or other obstruction, the blade can “kick back” the wood towards the user, thus creating the risk of injury to the user.

Another cutting tool employed by craftsmen is a miter saw. Often one of the most difficult aspects of carpentry is the ability to join two angled sections of wood together without showing a space therebetween. Such is a critical aesthetic feature of products such as cabinetry wherein the smallest deviation in the angle of the cut can create a noticeable gap between two joined angled ends. Thus, the tool of choice for making such angled cross cuts (i.e., a cut across the grain of the wood) is a miter saw. Miter saws excel in making such precise angled cross cuts, especially to smaller pieces of wood. In addition, miter saw blades spin away from the direction of the user, and as such, there is much less of kick back.

However, due to their smaller size, miter saws cannot make cuts to larger pieces of wood. A miter saw keeps the wood stationary and the blade moves, and therefore, the blade can only cut wood of a size up to the diameter of the blade. Further, miter saws do not function well in making rip cuts. Finally, miter saws are expensive, are cumbersome to carry to and from work sites, and generally cannot cut work pieces to consistent lengths and angles without repeated measurement and adjustment.

Accordingly, there remains a need for a solution to at least one of the aforementioned problems. For instance, there is an established need for a cutting device that can make repeated accurate angled cross cuts in large pieces of wood, as well as being able to make rip cuts in long pieces of wood. In addition, there is a need for such a cutting device that improves upon the safety of existing cutting devices.

SUMMARY OF THE INVENTION

The present invention can be directed to a miter device. The miter device can be used with a table saw, to make accurate angled cross cuts in all sizes of wood, while still permitting the table saw to make accurate rip cuts. The miter device described herein also can have a safety stop and a rear stop incorporated into the device which permits the user to maintain their body and their hands at a safe distance from the cutting blade of the table saw. The miter device herein permits a user to obtain all of the benefits of a miter saw on an existing table saw while improving the safety of the table saw.

In a first implementation of the invention there can be provided herein a miter device comprising:

a rectangular planar base which can have a top side, an opposing bottom side, a front end, an opposing back end, and two corresponding side ends, the rectangular planar base having a rectangular peninsula section extending from a central portion of the front end of the base and a rectangular recess indented along a corresponding central portion of the back end of the base;

two angled guide rails which can be releasably fixed to the top side of the base, each of which extends in a first angular direction starting from the central portion of the front end towards a different one of the corresponding side ends, and then each turning to extend in a second angular direction which can be directly perpendicular to the side ends;

two parallel longitudinal track guides each having a track opening running a longitudinal length of the track guide, and wherein the track guides are positioned along the bottom side of the base and extend from between the back end of the base to a position beyond the front end of the base, and which track guides are each adjustably secured to the base in an identical position along the track openings;

a safety stop inserted into an end of the track opening positioned beyond the front end of the base of at least one of the longitudinal track guides;

a front end fence which can be perpendicular to and extends along a front end of the rectangular peninsula section of the base;

a handle protruding from a front surface of the front end fence; and, a rear end fence, which can be perpendicular to and extend along an indented edge of the rectangular recess; and wherein the base can have a blade track extending from the peninsular section through the indented edge of the rectangular recess and a portion of the rear end fence.

The term “rectangular” as described herein with regard to the planar base can be understood to mean that at least the majority of the shape (e.g. from about 50% to about 90%, preferably from 60% to about 80%) of the planar base can be of a rectangular shape despite the presence of the peninsula section emanating from the front end and the presence of the recess indented along back end of the base, i.e., the front end and the opposing rear end can be parallel to each other, and both of which come to perpendicular corners with each of the corresponding side ends, which side ends, in and of themselves, can be parallel to each other.

In one aspect of the invention the front end and the opposing rear end can each have a lateral length of from about 18 inches to about 36 inches, preferably from about 20 inches to about 30 inches, and most preferably about 24 inches.

In another aspect of the invention, the corresponding side ends can each have a longitudinal length of from about 12 to about 30 inches, preferably from about 14 to about 24 inches, and most preferably from about 18 inches.

In yet another aspect of the invention, the rectangular peninsula section, and the rectangular recess can each have a lateral length of from about 6 inches to about 12 inches, preferably 7 inches to about 10 inches, and most preferably about 8 inches.

In yet even another aspect of the invention, the rectangular peninsula section can have a longitudinal length of from about 5 to about 10 inches, preferably from about 6 inches to about 8 inches.

In yet one other aspect of the invention, the rectangular recess can have a longitudinal indentation length of from about 2 to about 5 inches, preferably from 3 to about 4 inches and a lateral length which corresponds to the lateral length of the peninsula section.

In yet another aspect of the invention the rectangular planar base, peninsula section, and the front and rear fence each can have a thickness of from about 1 mm to about 3 mm, preferably from about 1.5 mm to about 2.5 mm, preferably of a metal material, such as the non-limiting examples of steel, including stainless steel, iron, aluminum, brass, titanium, and mixtures of any these.

In yet even another aspect of the invention, wherein the rectangular planar base can contain openings therein. Preferably the openings can provide visualization for the user of the track guides, and the placement of the same in the tracks of a table saw.

In yet even one other aspect of the invention, the rectangular planar base can comprise two halves which can be connected by a portion of the peninsular section, the entire front end fence, and a portion of the rear end fence. Preferably from 5% to 25%, more preferably from 10% to 20%, of the total perpendicular length of the rear end fence can used to connect the two halves of the base. Preferably the peninsular section can employ from 5% to 15%, preferably from 7% to 10% of the perpendicular length of the rear end fence to connect the two halves of the base.

In another aspect of the invention, the angled guide rails can comprise a planar guide rail support section which lies on the top side of the planar base and a corresponding perpendicular guide rail fence section. Preferably the planar guide rail support section and the guide rail fence section can each have a thickness corresponding to the thickness of the planar base described herein.

It will be understood herein that, the "front end of the rectangular planar base" can mean the front edge of the planar base which corresponds to the length of a straight line extending from one corner of the side edge along the front end and which cuts across the base of the peninsula section and extends to the other corner of where the front end meets the opposing side edge of the rectangular base. In contrast, the "central portion of the front end" can mean that the peninsula section's two corresponding parallel sides edges which extend out from the front end of the planar base at points equidistant from the side ends of the planar base. Therefore, the peninsula section can be "centered" along the front end of the planar base.

In one embodiment, the planar guide rail support section can extend the entire length of the first angular direction starting from the central portion of the front end, as can the corresponding perpendicular guide rail section. However, in one embodiment, the planar guide rail support section can be angled at its ends, e.g., having 45 degree angled cuts on ends thereof, which angled cuts when aligned flush with the central portion of the front end of the rectangular planar base, such planar guide rail section with such cuts, ends with an angled end, which angled end can also correspond to part of the perpendicular guide rail section which can extend at the turn to extend in the second angular direction perpendicular to the side ends, preferably such angled portion of the planar guide rail section at its end of the first angled direction can correspond to from 10% to 50% of the length of the perpendicular guide rail fence section that runs in the second angular direction after the turn.

In one embodiment, the planar guide rail section can be of from about 6 inches to about 15 inches, preferably from about 8 inches to about 13 inches. In another embodiment, the perpendicular guide rail fence section in the first angular direction can be the same length as the planar guide rail section. The perpendicular guide rail fence section in the second angular direction after the turn can be from about 3 inches to about 8 inches, preferably from about 4 to about 6 inches in length. The planar guide rail section and the perpendicular guide rail section can be each be the same width, which can be from about 2 to about 5 inches, preferably from about 2.5 to about 3.5 inches.

In yet another aspect of the invention the planar guide rail section and the perpendicular guide rail section can meet at a perpendicular joint to each other and can also be connected along the perpendicular joint where they meet.

In yet one other aspect of the invention, the planar guide rail sections can be releasably fixed to the top side of the rectangular planar base by any means, such as screws and nuts, bolts, and turn key handles fixed to screws which bisect both the planar guide rail sections and the base.

In one other aspect of the invention, the rectangular planar base can have a series of fixation element holes thereon which can permit the planar guide rail sections and their connected perpendicular guide rail sections, which can act as one connected unit, to be released from their fixation to the planar base in one position and rotated to a different angular position on the base.

In yet another aspect of the invention, the planar guide rail sections, and their connected perpendicular guide rail sections, which can act as one connected unit, can be released from their fixation to the planar base and rotated by moving the turn key handle attached to a screw in a pre-existing arc of from 0 degrees to 90 degrees, such angles being relative to the central portion of the front end of the base.

In yet still one other aspect of the invention, the planar guide rails section can have an opening along their first angled direction such that the rotation of the unit in the arc can be gauged by reference to a preexisting measurement guide of degree printed or engraved on the top side of the base such that it can be visible through the opening.

In yet still even another aspect of the invention, the preexisting arc can be a segmented arc, wherein the arc can be constructed of small sets of lines which ends thereof can be connected at angles to form the overall segmented arc. Preferably, each segmented arc forming line can be from 1 cm to 3 cm, preferably from about 1.5 to about 2 cm.

In one other aspect of the invention wherein the longitudinal track guides can be each adjustably secured to the planar base by turn key devices.

In yet one more aspect of the invention, the longitudinal track guides can extend from 6 inches to about 12 inches, preferably from about 8 inches to about 10 inches beyond the front end of the planar base, preferably outside the peninsula section of the planar base, i.e., to the left or right of the peninsula section of the planar base on the front end of the planar base.

In yet another aspect of the invention, the longitudinal track guides can be secured to the planar base by rectangular clamps, which clamps clamp the track guides to the planar base along a front end of the base, i.e., to the left and right of the peninsula section, and also to the back end to the planar base. Preferably the clamping can result in the longitudinal track guides being parallel to each other and parallel to the side ends of the base.

In one non-limiting embodiment, the clamps can be rectangular housings with a fixation portion and a clamping portion. The fixation portion of the clamp housing can be thicker than the clamping portion. The fixation portion can accommodate a fixation element, such as a screw, e.g., a machine screw, which is inverted, the head of the screw being located in the track opening of the track guides, and the post portion of the screw extending through the fixation portion through a hole therein which can be capped with a turn key attachment.

In another embodiment, the head of the screw and the other components of the clamps, there along, can be dragged to a suitable position in the track opening along the track guides, such that the clamping portion of the housing can be over the top side of the planar base, which track guides in turn can be located in tracks of a table saw, and the tightening of the turn key above the fixation portion causes the clamping portion to likewise tighten and clamp the track guide to the planar base.

In yet still another aspect of the invention, the two parallel longitudinal track guides each can be from about 16 to about 36 inches, preferably from about 18 to about 30 inches, and most preferably from about 20 inches to about 28 inches.

In yet another aspect of the invention, the track opening can be formed by sides of the track guides wrapping around a top of the track guides to leave an opening there along which can function to retain the screw head of the clamps described herein.

In yet still another aspect of the invention, the two parallel longitudinal track guides can extend from about 4 inches to about 12 inches, preferably from about 6 inches to about 10 inches from the front end of the planar base.

In one other aspect of the invention, the safety stop inserted into an end of the track opening can extend a length of from 2 inches to about 6 inches, preferably from about 3 to 4 inches beyond the end of the track ending of the longitudinal track guide into which it can be inserted. Preferably the safety stop can be affixed to the track opening by a turn key component. Preferably a safety stop can be inserted into an end of both of the ends of the track openings in the longitudinal track guides.

In yet one other aspect of the invention, the front end fence can extend along the entire front end of the rectangular peninsula section of the base. Preferably the front end fence can be from about 1.5 inches to about 4 inches, preferably from about 2.0 inches to about 3.0 inches in height.

In yet still one other aspect of the invention, the handle protruding from the front surface of the front end fence can be supported on either side by posts having a length of from about 2 inches to about 6 inches, preferably from about 3 inches to about 4 inches.

In yet still even one other aspect of the invention, the rear end fence can extend along the entire rear end of the recessed indented section of the base. Preferably the rear end fence can be from about 3 to about 8 inches, preferably from about 4 to about 6 inches in height.

In yet still another aspect of the invention, the base can have a blade track extending through 80% to about 95%, preferably from about 85% to about 90% of the length of the peninsular section and also the height of the rear end fence.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
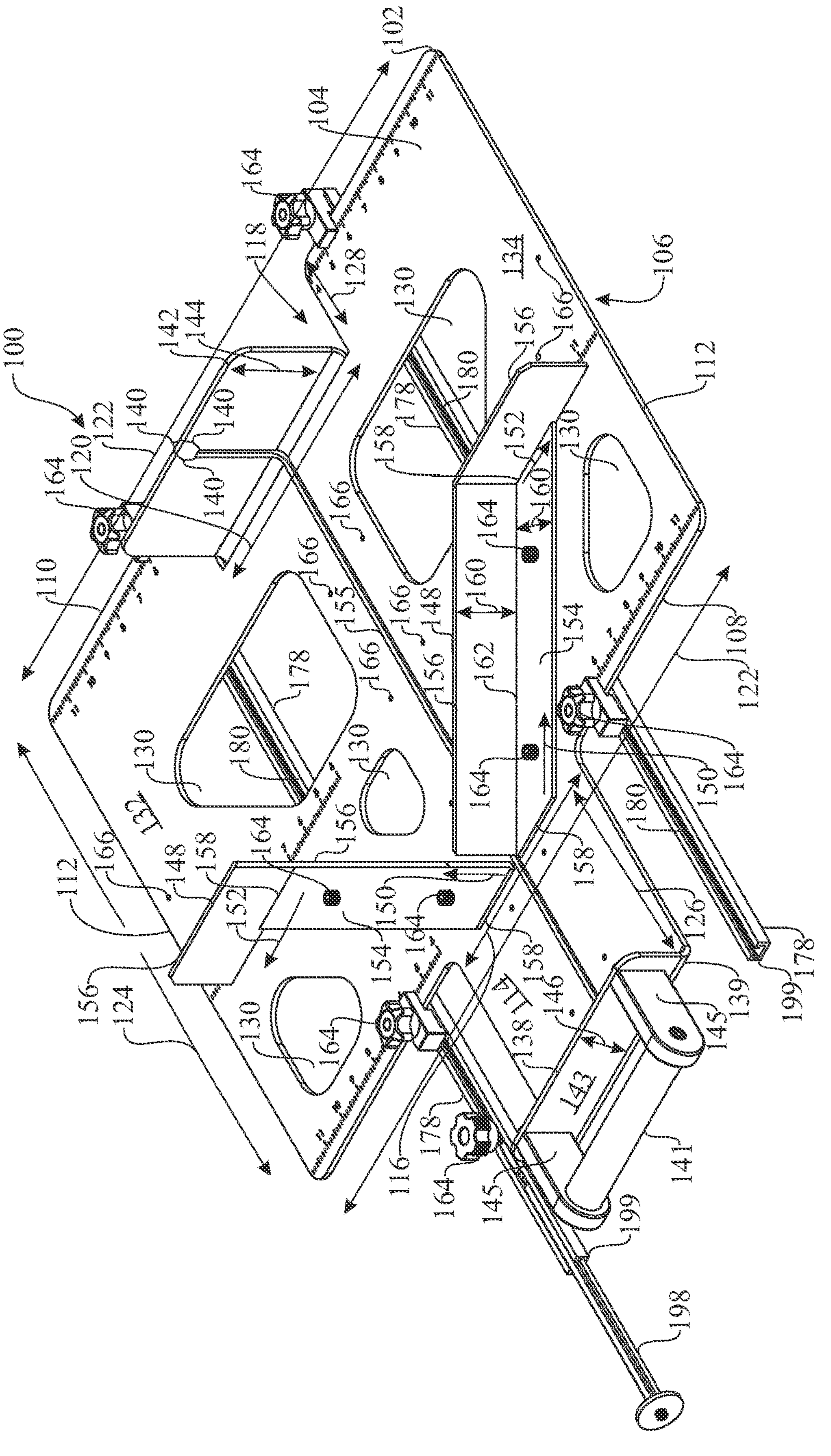
FIG. 1 present a perspective view of the miter device of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1 and/or FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-3 and 7-9, there can be provided a miter device 100 having a rectangular planar base 102, which can have a top side 104, an opposing bottom side 106, a front end 108, an opposing back end 110, and two corresponding side ends 112. The rectangular planar base 102 can also have a rectangular peninsula section 114 extending from a central portion 116 of the front end 108 of the planar base 102. The rectangular planar base 102 can also have a rectangular recess 118 indented along a corresponding central portion 120 of the back end 110 of the planar base 102. The front end 108 and the back end 110 of the planar base 102 can have a lateral length 122 and the side ends 112 can each have a longitudinal length 124.

Still referring to FIGS. 1-3 and 7-9, the rectangular peninsula section 114 and the rectangular recess 118 can each have a lateral length which corresponds to the central portion 116 of the front end 108 and the central portion 120 of the back end 110, respectively. The rectangular peninsula section 114 can have a longitudinal length 126. The rectangular recess 118 can have a longitudinal indentation length 128 and a lateral length which corresponds in placement to the central portion of the rear 120 and in length to the lateral length of the peninsula section 114, i.e., the central portion 116 of the front end 108. The rectangular planar base 102 can contain opening therein.

Figure 2:
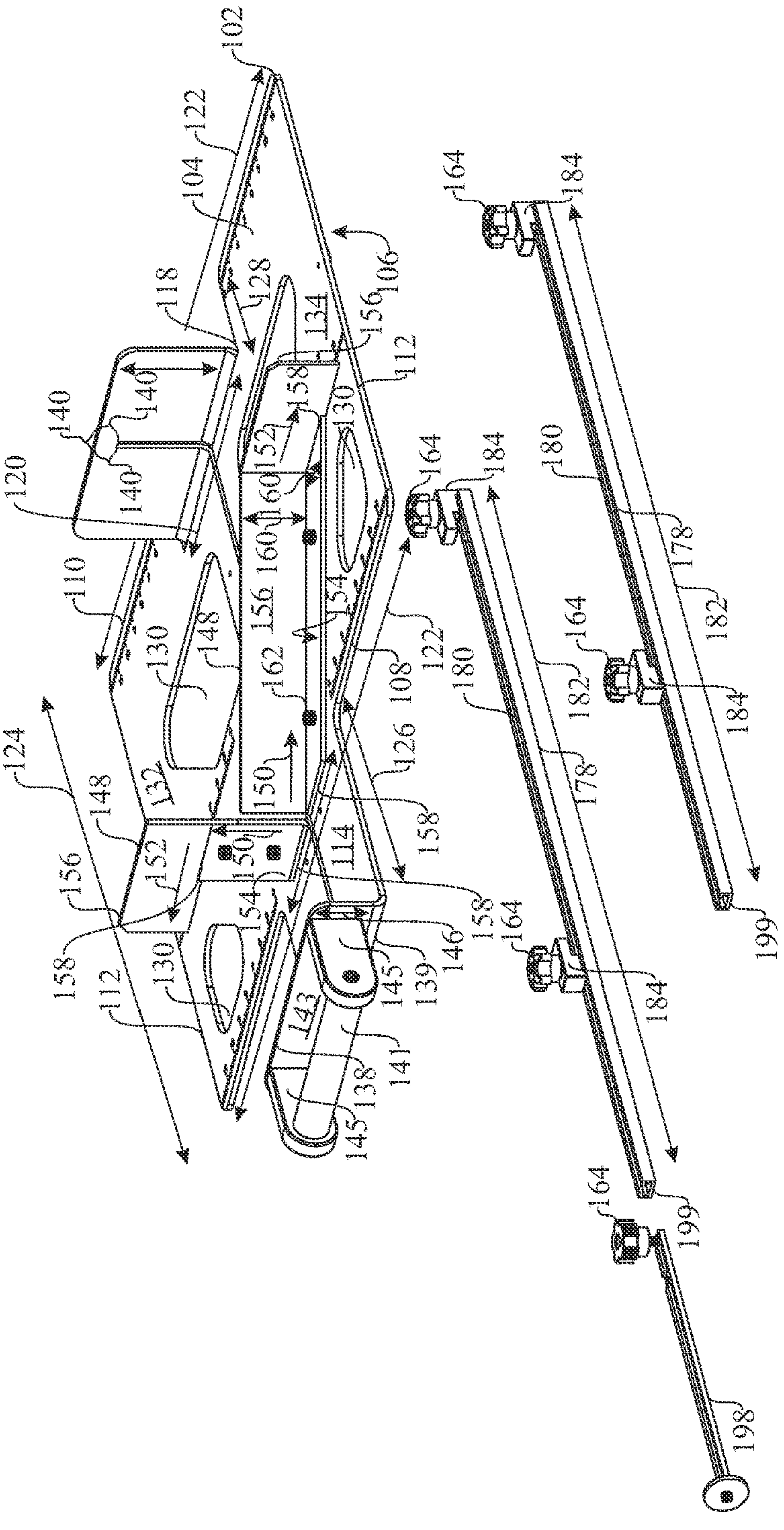
FIG. 2 presents a low side view of the components of the miter device of FIG. 1.
Figure 3:
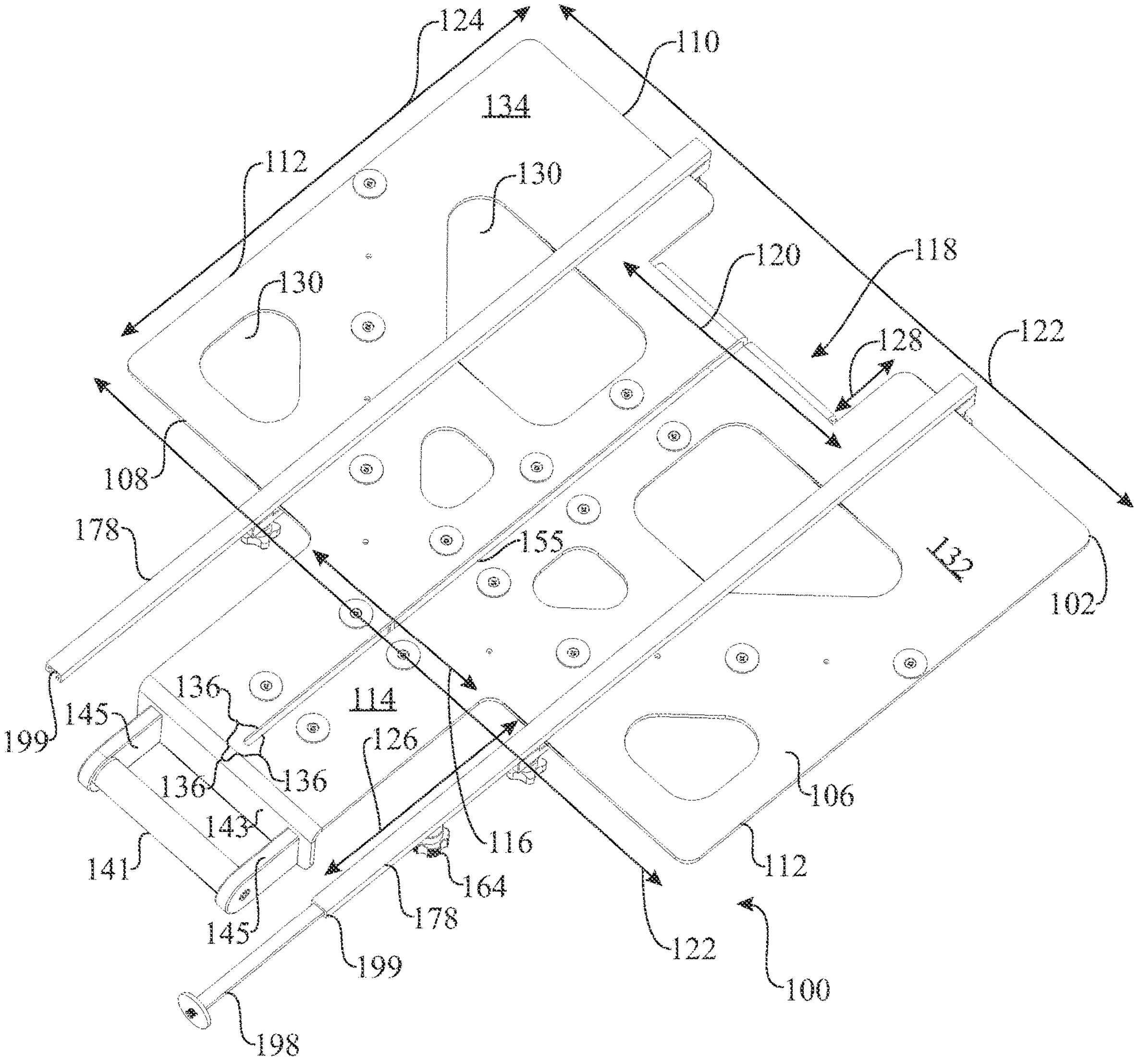
FIG. 3 presents a perspective bottom view of the miter device of FIG. 1.
Figure 8:
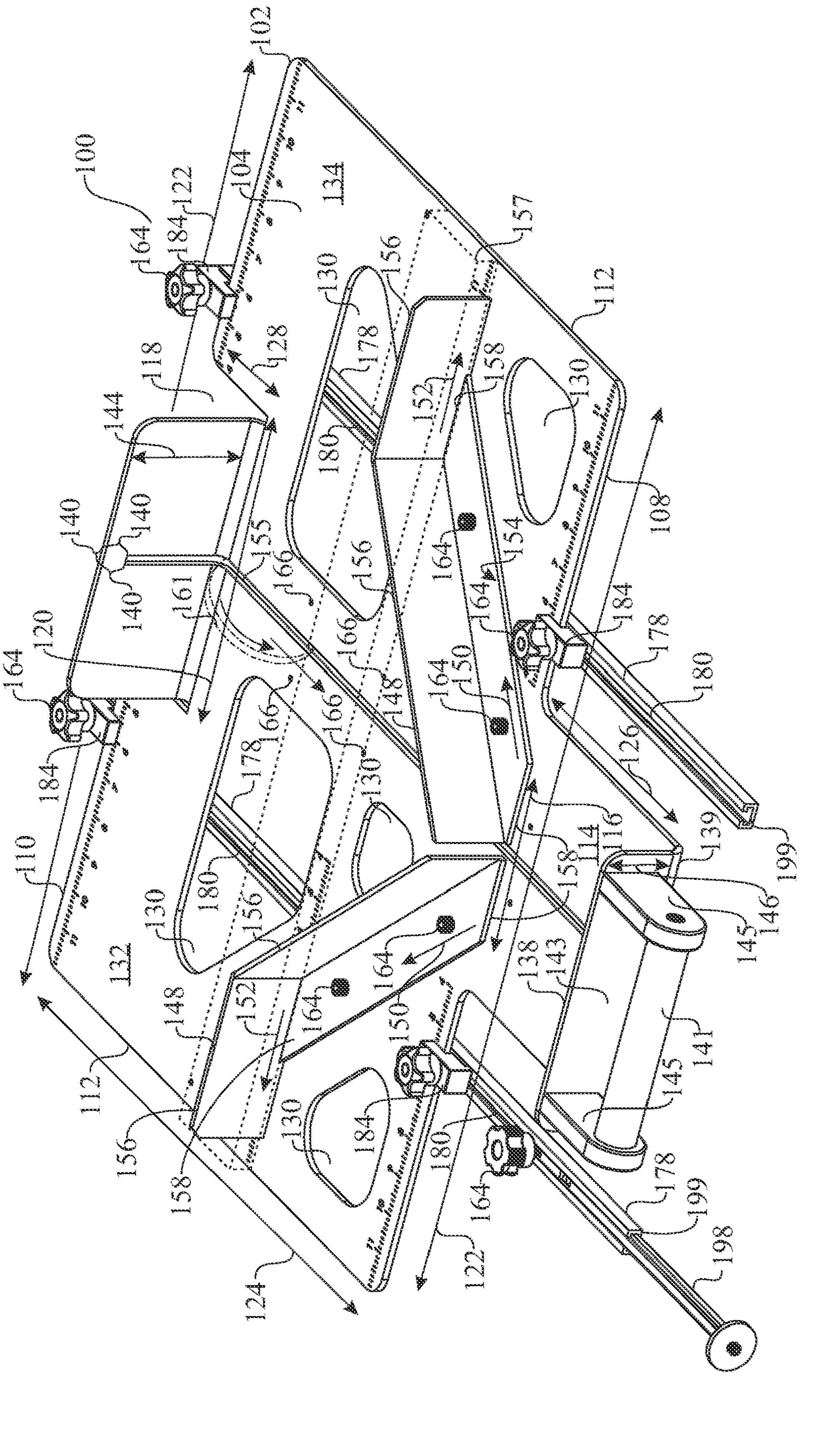
FIG. 8 presents a perspective view of the miter device of FIG. 1 showing in dashed lines a beam prepared to be cut by a blade in a cross cut direction.
Figure 9:
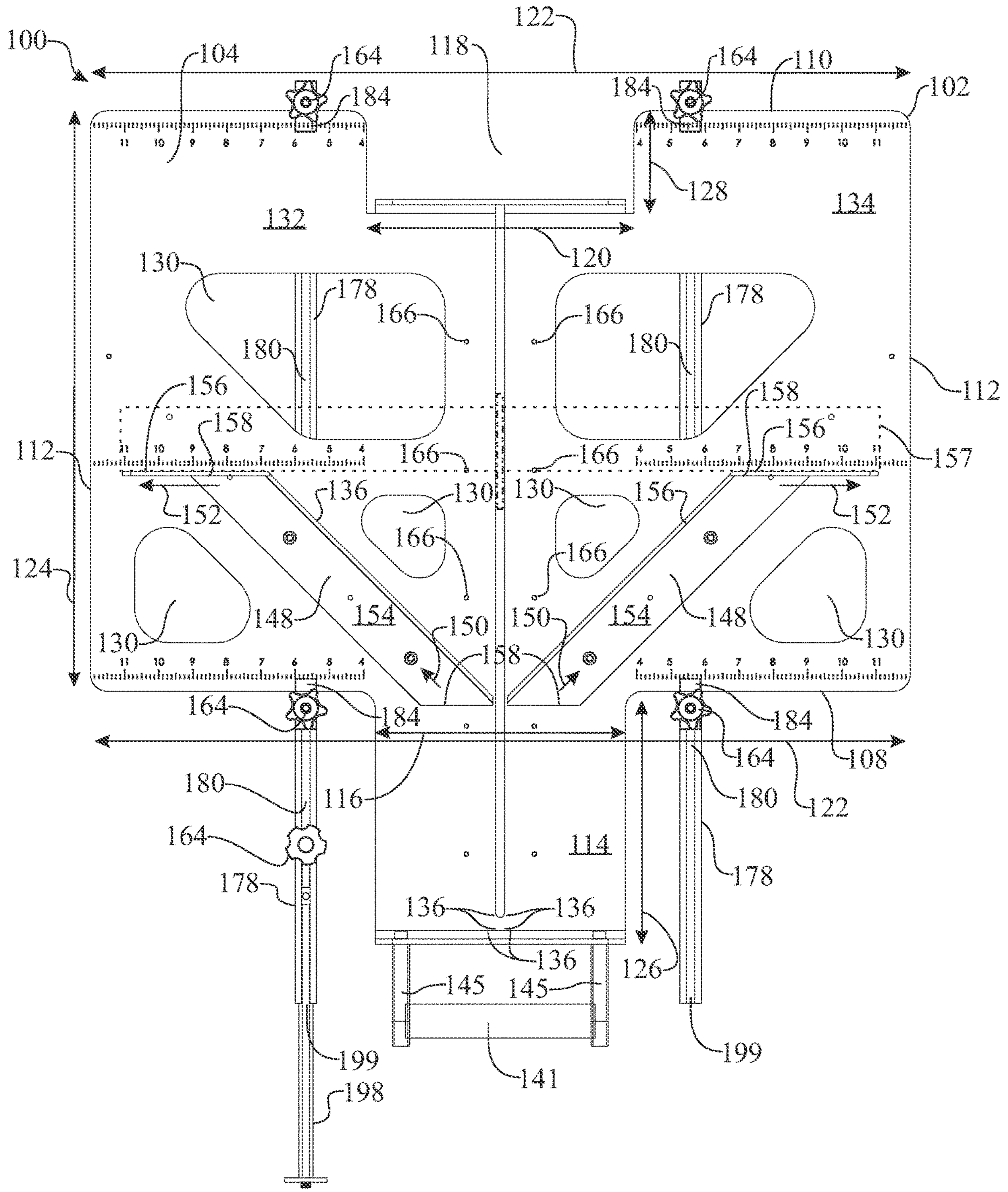
FIG. 9 shows a bottom view of the miter device of FIG. 8 and the blade and beam in dashed lines.
Figure 10:
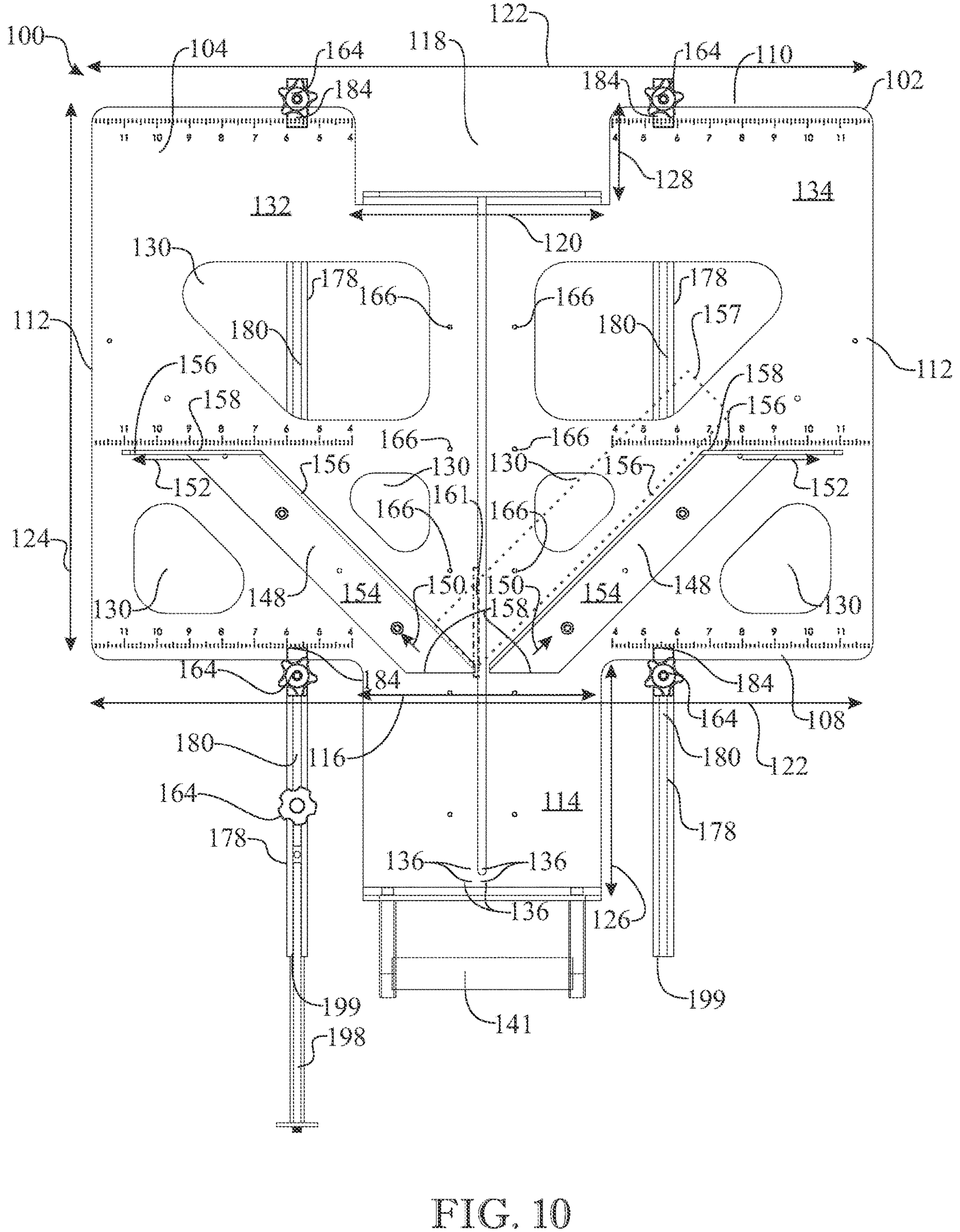
FIG. 10 presents an overhead view of the miter device of FIG. 1 containing a beam in dashed lines in a position between the angled guide rails about to be cut in an angled cross cut.

Referring first to FIGS. 3, 9 and 10, the rectangular planar base 102 can also be comprises of two halves 132 and 134 which can be connected by a portion 136 of the peninsular section 114, (now referring to FIGS. 1, 2 and 8) the entire front end fence 138 and a portion 140 of the rear end fence 142. The rear end fence 142 can have a perpendicular length 144. The front end fence 138 can have a perpendicular length 146.

Referring now to FIGS. 1, 2 and 8-10, the miter device 100 can also have two angled guide rails 148 which can be releasably fixed to the top side 104 of the rectangular planar base 102. Each of the angled guide rails 148 extends in a first angular direction 150 starting from the central portion 116 of the front end 108 towards a different one of the corresponding side ends 112. Then each of the two angled guide rails 148 turns to extend in a second angular direction 152 which can be directly perpendicular to the side ends 112.

Referring still to FIGS. 1, 2 and 8-10, the two angular guide rails 148 can be made up of a planar guide rail support section 154 which lies on the top side 104 of the planar base 102 and a corresponding perpendicular guide rail fence section 156. It will be understood herein that reference to first direction 150 can encompass the entire length of the planar guide rail support section 154 and perpendicular guide rail fence section 156 before the turn to the second direction 152. Likewise, will be understood herein that reference to second direction 152 can encompass the entire length of the planar guide rail support section 154 and perpendicular guide rail fence section 156 after the turn from the first direction 150.

In one embodiment, the "front end of the rectangular base" corresponds to the line 122 along the front end 108 of the base 102. In addition, the "central portion of the front end" can correspond to the line 116, which can also be defined as the base of the peninsula 116. The parallel side edges of the peninsula correspond to the longitudinal length of the peninsula 126. In one embodiment the planar guide rail support section 154 can be angled at its ends 158

In one embodiment, the planar guide rail support section 154 can extend the entire length of the first angular direction 150 starting from the central portion 116 of the front end 108, as can the perpendicular guide rail fence section 156 and then extend at the turn to extend in the second angular direction 152 perpendicular to the side ends 112. The angled end 158 of the planar guide rail support section 154 at the end of the first angular direction 150 can be wide enough to also support and correspond to the above described percentages of the length of the perpendicular guide rail section 156 that runs in the second angled direction 152. The planar guide rail support section 154 and the perpendicular guide rail fence section 156 can each have the same width.

Figure 13:
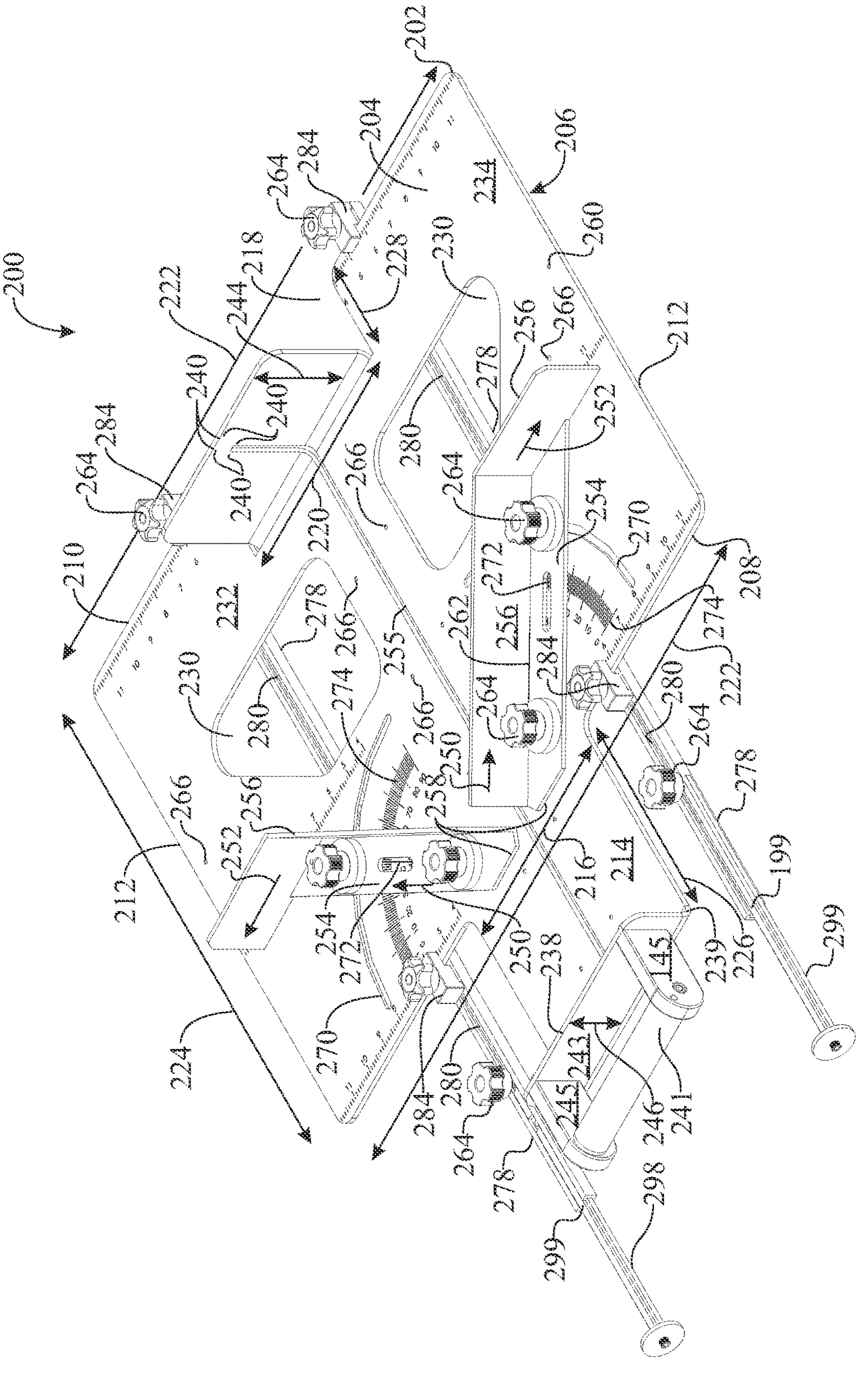
FIG. 13 presents a perspective view of an alternative embodiment of the miter device of the present invention.
Figure 14:
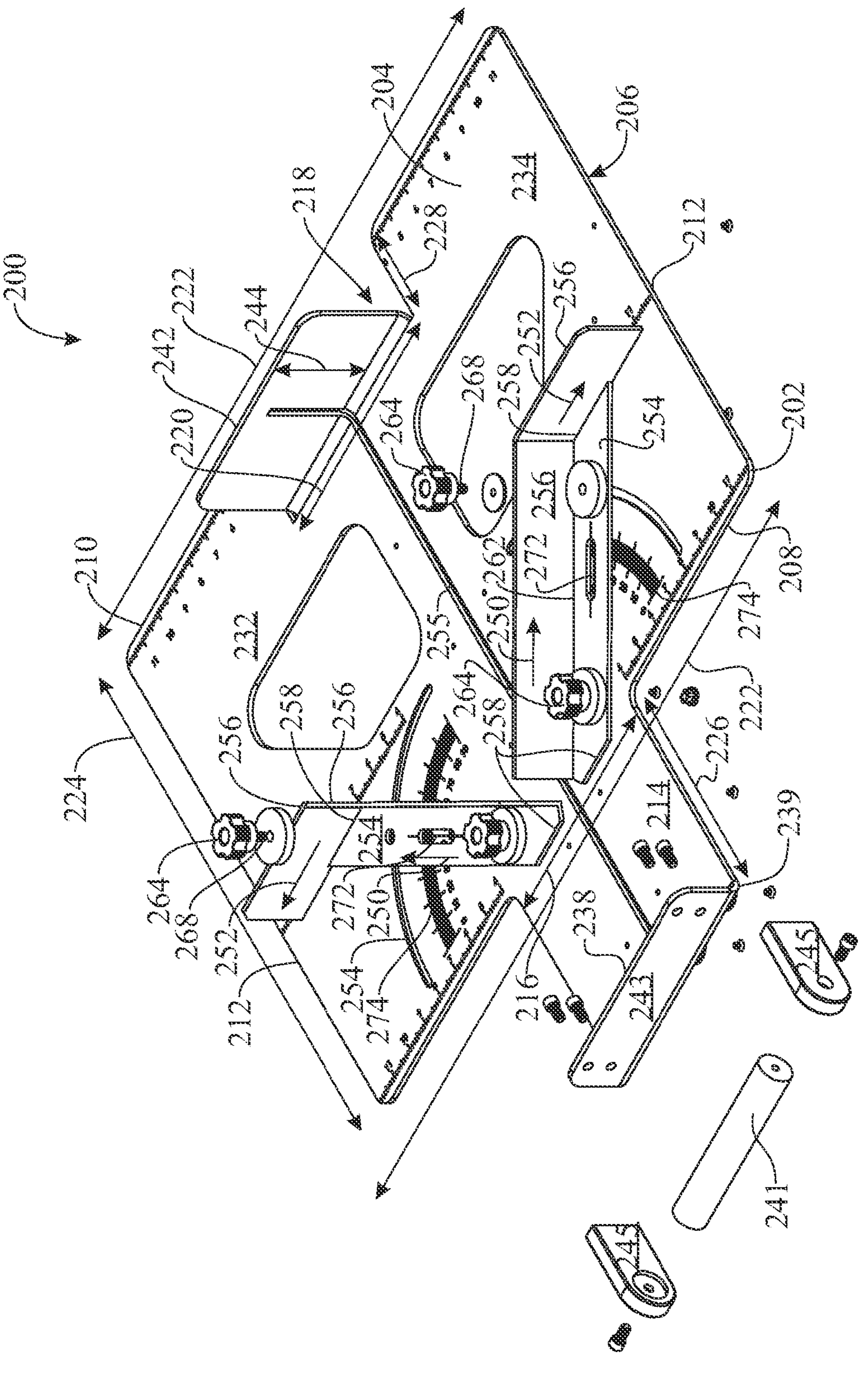
FIG. 14 is an exploded view of the miter device of FIG. 13.
Figure 15:
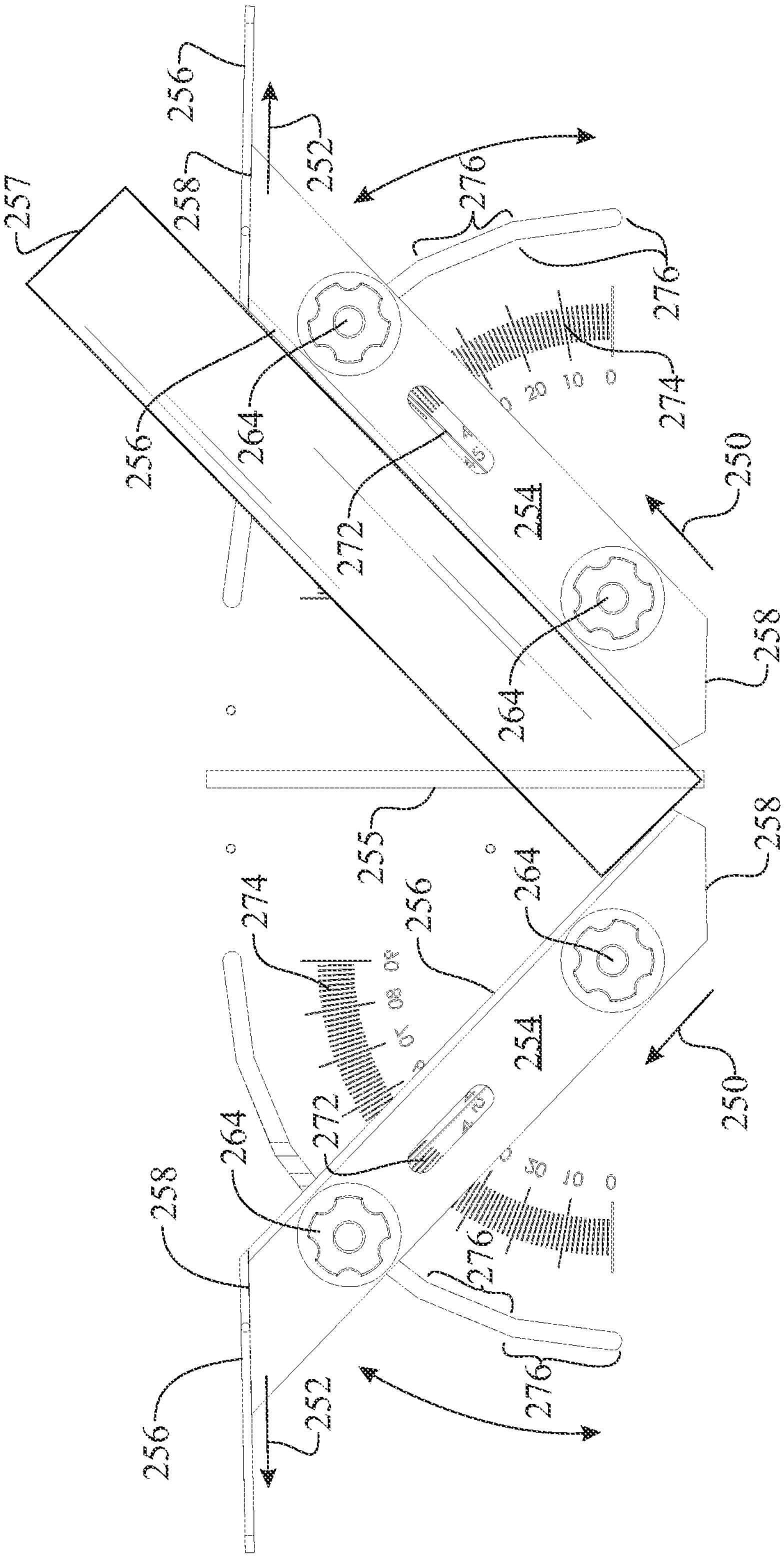
FIG. 15 is a highlighted view of the two angled guide rails of the miter device of FIG. 13 containing a beam positioned to be cut in an angled cross cut.

In another embodiment, the planar guide rail support section 154 and the perpendicular guide rail section 156 can meet at a perpendicular joint 162 and can also be connected to each other along the joint 162 by applicable means such as a weld, solder or the like. Referring now to FIGS. 1 and 8-10, the planar guide rail support sections 154 can be releasably fixed to the top side 104 of the rectangular planar base 102 by any fixation means 164 as described herein. Referring to FIGS. 13-15, the fixation means 264 can be turn key handles 264.

Referring to FIGS. 1 and 8-10, the rectangular planar base 102 can have a series of fixation element holes 166 which can permit the planar guide rail support sections 154 and their connected perpendicular guide rail sections 156 to be repositioned to a different angular position on the base 102.

Referring now to FIGS. 13-15, the reference numbers used in FIGS. 1-12 are equivalent to those herein with the exception that the one hundred series of reference numerals are re-stated in a two hundred series of reference numerals, e.g., 104 in FIG. 1 becomes 204 in FIGS. 13-15 and the like. In one embodiment, the planar guide rail support sections 254 and their connected perpendicular guide rail sections 256 can be released from their fixation to the planar base 204 and rotated by moving the turn key handles 264 attached to a screw 268 in a pre-existing arc 270 in the aforementioned angles. The planar guide rails 254 can have an opening 272 along the first angled direction 250 such that the specific angle of rotation of the unit 254/256 in the arc 270 (shown by the arrows in FIG. 15) can be gauged by reference to a pre-existing measurement guide 274 of the degrees moved which can be on the top side 204 of the base 202 such that it can be visible through the opening 272. The preexisting arc 270 can be made up of segments 276 which can be straight lines which can be each joined to the adjoining segment 276 to provide for the overall segmented arc 270. The presence of the round screw 268 in the straight segments 276 prevents the screw 268 from easily moving along the arc 270 without first reducing pressure thereon by loosening the turn key 264.

Referring now to FIGS. 1-5 and 8-10, the miter 100 can also have two parallel longitudinal track guides 178 each having a track opening 180 running a longitudinal length 182 of the track guide 178. The track guides 178 can be positioned along the bottom side 106 of the base 102 and extend from between the back end 110 of the base 102 to a position beyond the front end 108 of the base 102, and which track guides 178 can be each adjustably secured to the base 102 in an identical position along the track openings 180. Preferably each of the longitudinal track guides 178 can be each adjustably secured to the planar base 102 by turn key devices 264. The track guides 178 extend the above noted distances beyond the front end 108 of the planar base 102, preferably outside the peninsular section 114 of the planar base 102 on the front end 108 of the planar base 102.

Figure 4:
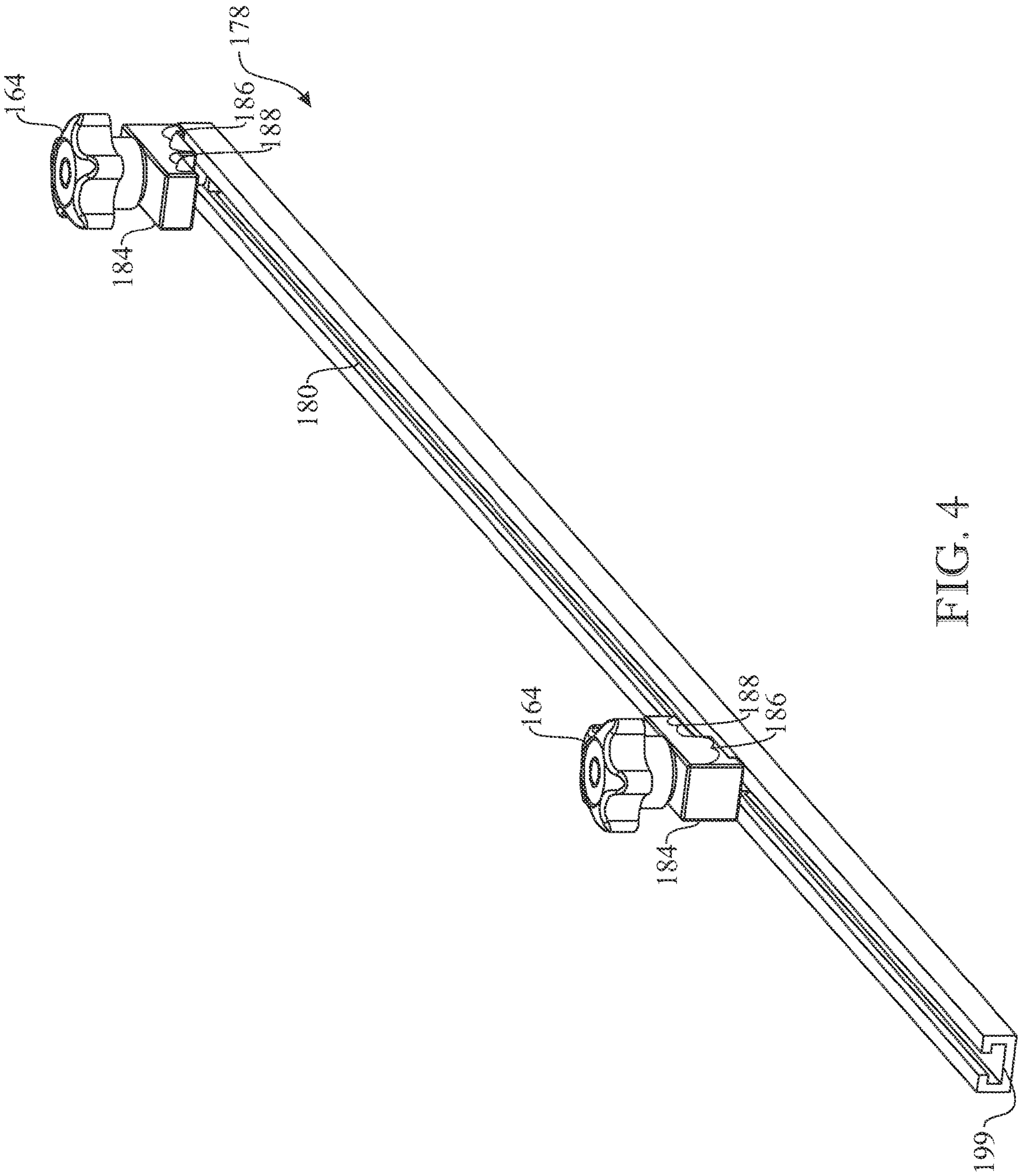
FIG. 4 presents an enlarged view of one of the two longitudinal track guides in the miter device of FIG. 1.
Figure 5:
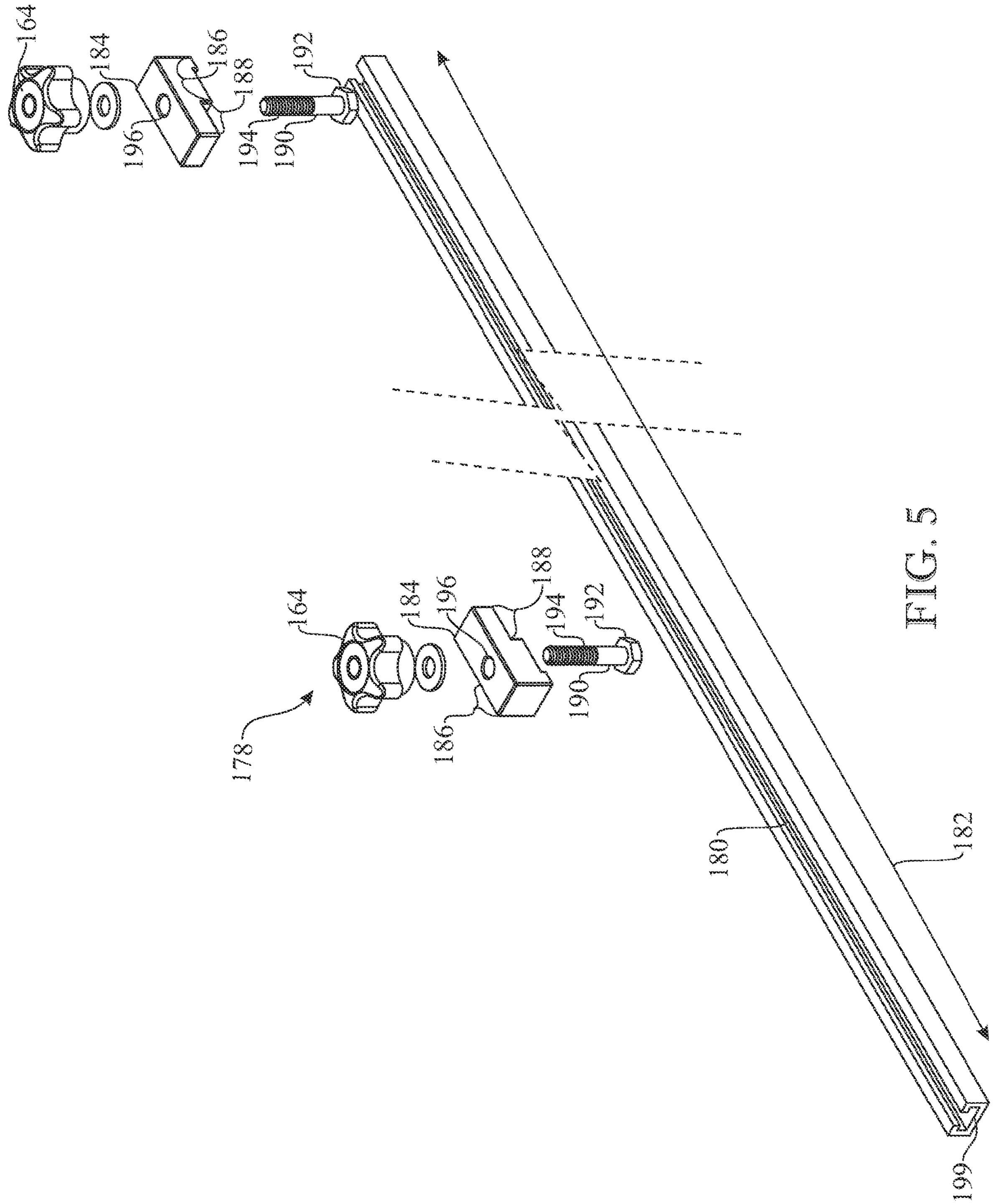
FIG. 5 presents an exploded view of the longitudinal track guide of FIG. 4.

Referring now more specifically to FIGS. 4 and 5, the longitudinal track guides 178 can be secured to the planar base 102 by rectangular clamps 184. The rectangular clamps 184 can be rectangular housings having a fixation portion 186 and a clamping portion 188. The fixation portion 186 of the clamp 184 can be thicker than the clamping portion 188. The fixation portion 186 can accommodate a fixation element 190 such as a screw 190, which is inverted, the head 192 of the screw 190 being located in the track opening 180 of the track guides 178, and the post portion 194 of the scree 190 can extend through the fixation portion 186 through a hole 196 therein, which can be capped with the turn key 164. The head 192 of the screw 190 and the other components of the clamp 184 can be dragged to a suitable position in the track opening 180 of the track guides 178, such that the clamping portion 188 of the clamps 184 is over the top side 108 of the planar base 102, which track guides 178 in turn can be located in tracks of a table saw (not shown), and the tightening of the turn key 164 above the fixation portion 186 can cause the clamping portion 188 to likewise tighten and clamp the track guide 178 to the planar base 102.

Figure 6:
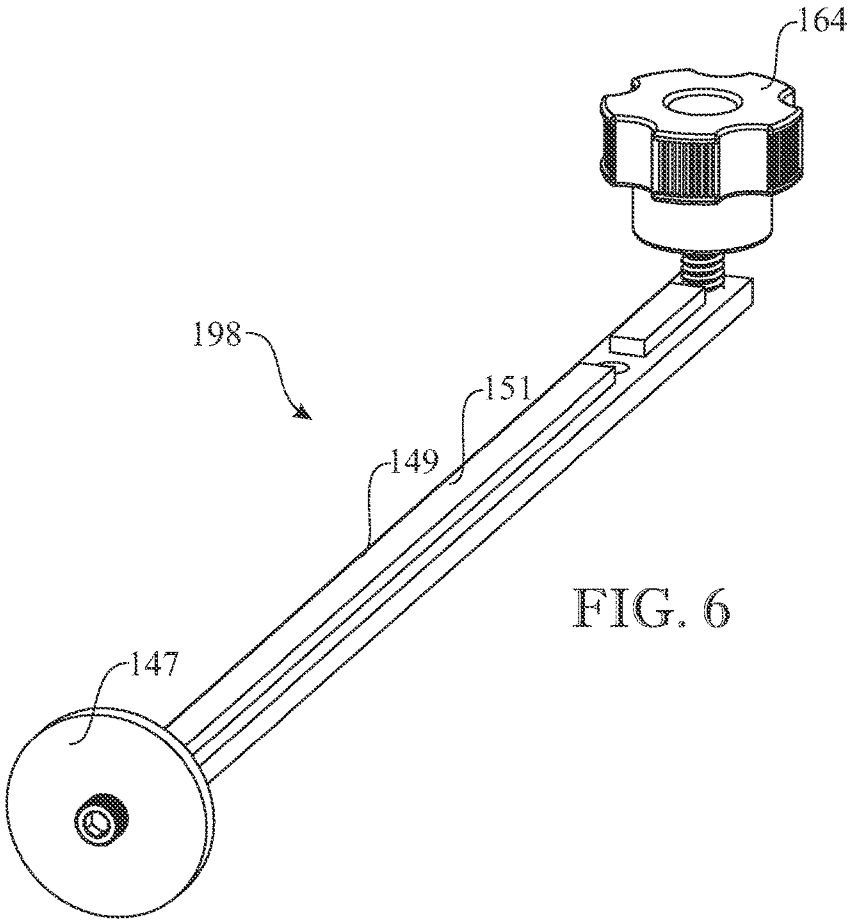
FIG. 6 presents a perspective view of the safety stop of the miter device of FIG. 1.
Figure 7:
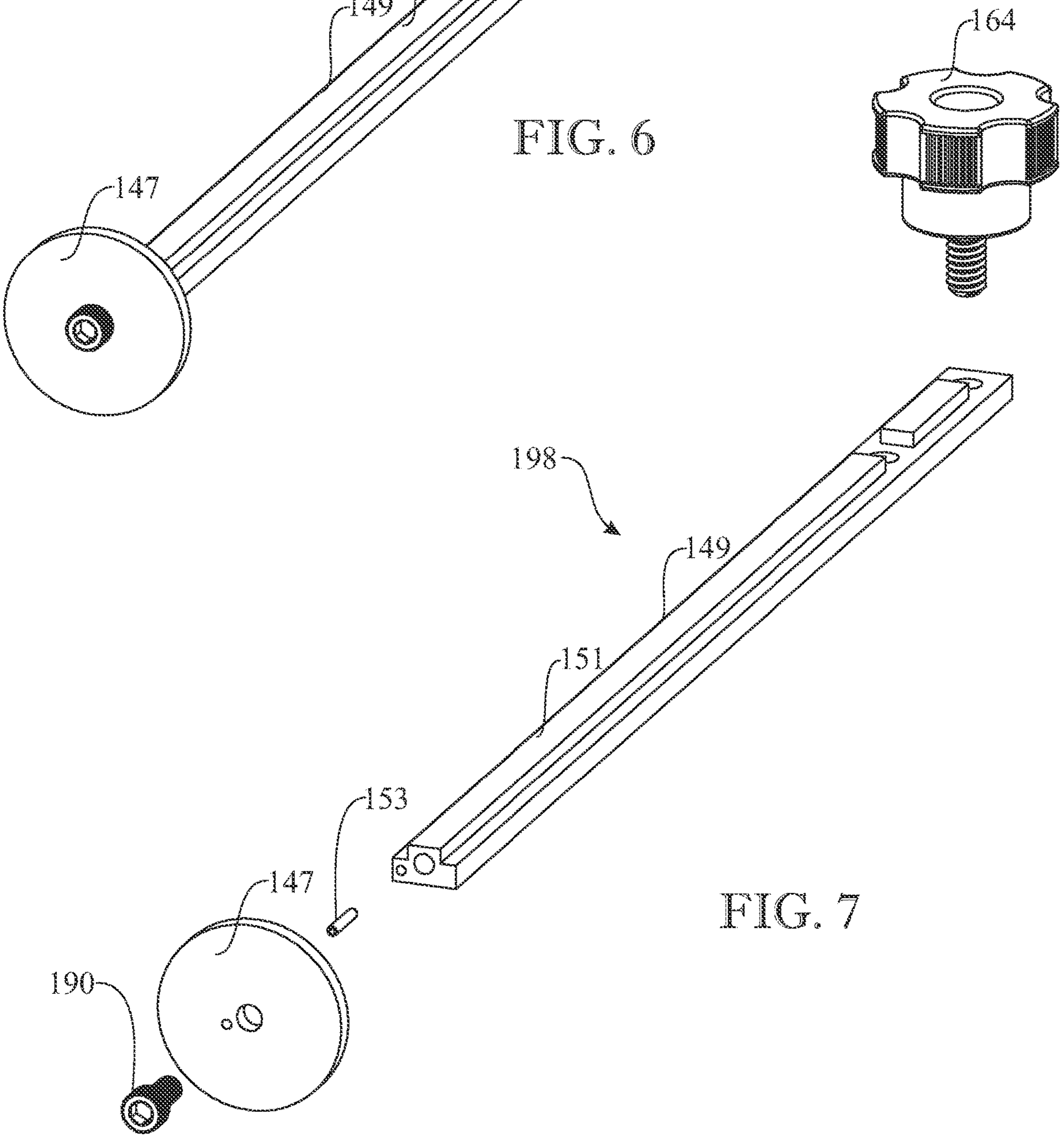
FIG. 7 presents an exploded view of the safety stop of the miter device of FIG. 1.

Referring now to FIGS. 1-3 and 6-10 the miter device 100 can have a safety stop 198 inserted into an end 199 of the track opening 180 of the track guides 178 positioned beyond the front end 108 of the base 102. The safety stop 198 can be affixed to the track opening 180 by a turn key 164 component. In one embodiment a safety stop 198 can be inserted into both ends 199 of the track openings 180 in the two longitudinal track guides 178. Referring more specifically to FIGS. 6 and 7, the safety stop 198 can have stop portion 147 and a post portion 149 which in turn can have a raised step 151 there along. The stop portion 147 can be affixed to the post portion 149 by a fixation element 190, which can be an Allen head bolt 190 and a pin 153.

Referring now to FIGS. 1, 2 and 8 the miter device 100 can have front end fence 138 which can be perpendicular to and extends along a front end 139, preferably an entire front end 139 of the rectangular peninsula section 114 of the base 102. The miter device 100 can also have a handle 141 protruding from a front surface 143 of the front end fence 138, which can be supported by posts 145.

Referring now to FIGS. 1, 2 and 8 the miter device 100 can have rear end fence 142, which can be perpendicular to and extends along the central part 120 of the back end 110, preferably along the entire central part 120 of the back end 110.

Referring to FIGS. 1, 3 and 8-10 the base 102 can have a blade track 155 extending from the peninsular section 114 through the indented central part 120 of the back side 110 and a portion of the rear fence 142.

Figure 11:
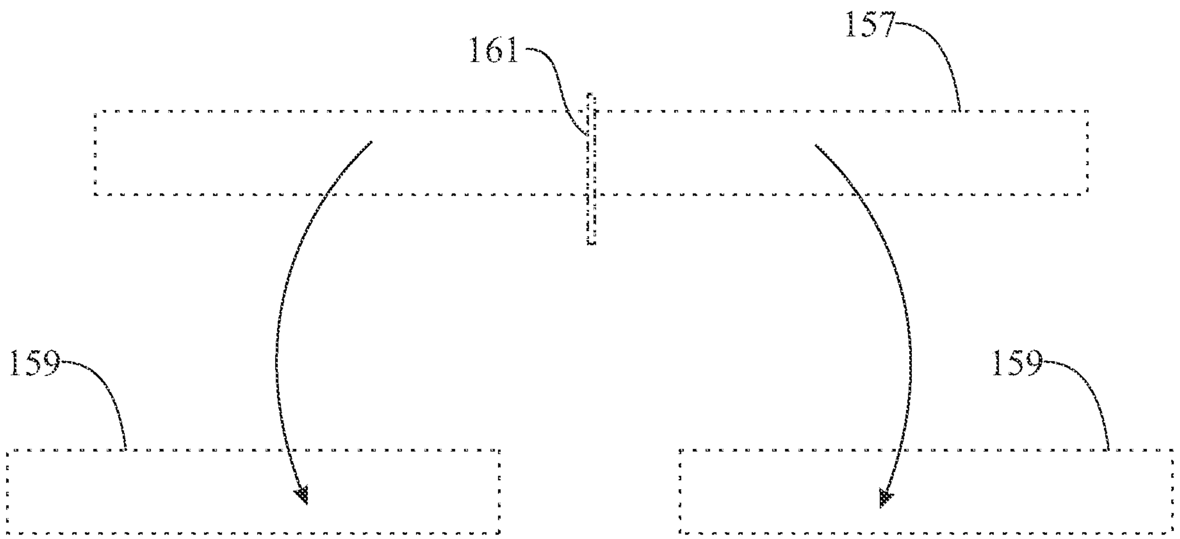
FIG. 11 presents a view of the beam of FIGS. 8-9 as it is being cut and after being cut by the blade.
Figure 12:
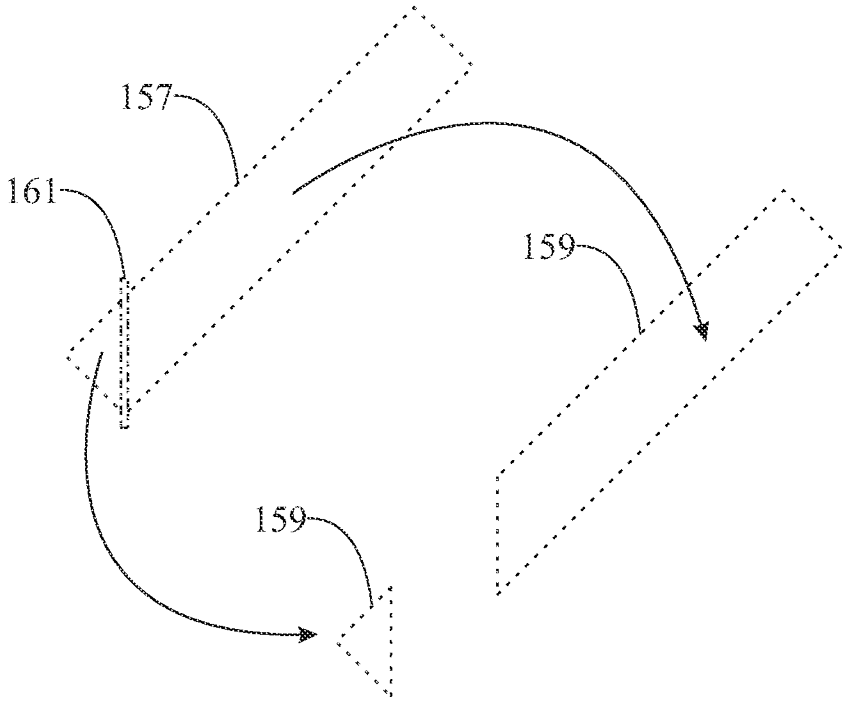
FIG. 12 presents a view of the beam of FIG. 10 as it is being cut and after being cut by the blade.

Referring to FIGS. 8, 9 and 11, the miter device 100 can be used to cut a board 155 into two parts 157 directly across the grain, i.e., a cross cut by a blade 159 of a table saw (not shown) by placing the board 155 flush along the perpendicular guide rail fence section 156 of the second direction 152 and pushing the handle 141 in the direction of the blade 159. Alternatively, referring to FIGS. 10, 12 and 15 the miter device 100 can be used to cut board 155 into two parts 157 at an angle, i.e., an angled cross cut by the blade 159 by placing the board 155 flush along side one of the perpendicular guide rail fence sections 156 of the first direction 150 and pushing the handle 141 in the direction of the blade 159.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A miter device comprising:

a rectangular planar base which has a top side, an opposing bottom side, a front end, an opposing back end, and two corresponding side ends, the rectangular planar base having a rectangular peninsula section extending from a central portion of the front end of the base and a rectangular recess indented along a corresponding central portion of the back end of the base;

two angled guide rails which are releasably fixed to the top side of the base, each of which extends in a first angular direction starting from the central portion of the front end towards a different one of the corresponding side ends, and then each turning to extend in a second angular direction which is directly perpendicular to the side ends;

two parallel longitudinal track guides each having a track opening running a longitudinal length of the track guide, and wherein the track guides are positioned along the bottom side of the base and extend from between the back end of the base to a position beyond the front end of the base, and which track guides are each adjustably secured to the base in an identical position along the track openings;

a safety stop inserted into an end of the track opening positioned beyond the front end of the base of at least one of the longitudinal track guides;

a front end fence which is perpendicular to and extends along a front end of the rectangular peninsula section of the base;

a handle protruding from a front surface of the front end fence; and, a rear end fence, which is perpendicular to and extends along an indented edge of the rectangular recess; and wherein the base has a blade track extending from the peninsular section through the indented edge of the rectangular recess and a portion of the rear end fence.

2. The miter device of claim 1, wherein the rectangular peninsula section, and the rectangular recess can each have a lateral length of from about 6 inches to about 12 inches.

3. The miter device of claim 1, wherein the rectangular peninsula section has a longitudinal length of from about 5 to about 10 inches.

4. The miter device of claim 1, wherein the rectangular recess has a longitudinal indentation length of from about 2 to about 5 inches, and a lateral length which corresponds to the lateral length of the peninsula section.

5. The miter device of claim 1, wherein the rectangular planar base, peninsula section, and the front and rear fence each can have a thickness of from about 1 mm to about 3 mm, and each of which is made of a metal material, selected from the group consisting of steel, stainless steel, iron, aluminum, brass, titanium, and alloys thereof.

6. The miter device of claim 1, wherein the rectangular planar base contains openings therein.

7. The miter device of claim 1, wherein the rectangular planar base comprises two halves which are connected by a portion of the peninsular section, the entire front end fence, and a portion of the rear end fence.

8. The miter device of claim 1, wherein the peninsula section is centered along the front end of the planar base.

9. The miter device of claim 1, wherein the angled guide rails comprise a planar guide rail support section which lies on the top side of the planar base and a corresponding perpendicular guide rail fence section.

10. The miter device of claim 9, wherein the planar guide rail section is of from about 6 inches to about 15 inches.

11. The miter device of claim 9, wherein the perpendicular guide rail fence section in the second angular direction after the turn can be from about 3 inches to about 8 inches.

12. The miter device of claim 1, wherein the planar guide rail sections are releasably fixed to the top side of the rectangular planar base.

13. The miter device of claim 1, wherein the rectangular planar base has a series of fixation element holes thereon.

14. The miter device of claim 9, wherein, the planar guide rail sections, and their connected perpendicular guide rail sections, are configured such that they are capable of being released from their fixation to the planar base and rotated in an angle relative to the central portion of the front end of the base.

15. The miter device of claim 9, wherein, the planar guide rails section have an opening along their first angled direction such that the rotation of the unit in an arc is capable of being gauged by reference to a preexisting measurement guide of degree printed or engraved on the top side of the base such that it can be visible through the opening.

16. The miter device of claim 15, wherein, the preexisting arc can be a segmented arc.

17. The miter device of claim 1, wherein the longitudinal track guides are each adjustably secured to the planar base by turn key devices.

18. The miter device of claim 1, wherein the longitudinal track guides are secured to the planar base by rectangular clamps.

19. The miter device of claim 1, wherein the track openings are formed by sides of the track guides being wrapped around a top of the track guides to leave an opening there along.

20. The miter device of claim 1, wherein the handle protruding from the front surface of the front end fence is supported on either side by posts having a length of from about 2 inches to about 6 inches.

* * * * *